United States Patent
Tecu et al.

(10) Patent No.: US 7,012,234 B2
(45) Date of Patent: Mar. 14, 2006

(54) APPARATUS AND METHOD FOR CAPTURING OVERSIZE IMAGES FOR IMAGING DEVICES

(75) Inventors: Kirk S. Tecu, Greeley, CO (US); W. Robert Haas, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 10/319,744

(22) Filed: Dec. 13, 2002

(65) Prior Publication Data

US 2004/0113045 A1 Jun. 17, 2004

(51) Int. Cl.
*H01L 27/00* (2006.01)

(52) U.S. Cl. .................... 250/208.1; 358/474; 355/44; 355/55

(58) Field of Classification Search .............. 250/208.1; 358/474, 497; 355/44, 45, 55, 57
See application file for complete search history.

(56) References Cited

U.S. PATENT DOCUMENTS

| | | | | |
|---|---|---|---|---|
| 4,027,315 A | * | 5/1977 | Barney | 396/338 |
| 4,174,895 A | * | 11/1979 | Fermaglich et al. | 396/333 |
| 4,860,117 A | * | 8/1989 | Sasaki | 358/451 |
| 5,137,347 A | * | 8/1992 | Imai | 353/26 A |
| 5,847,884 A | * | 12/1998 | Kamon et al. | 359/806 |
| 5,987,270 A | | 11/1999 | Hulan et al. | |
| 6,080,980 A | | 6/2000 | Steinle | |
| 6,096,715 A | | 8/2000 | Rossi et al. | |
| 6,163,659 A | | 12/2000 | Chen | |
| 6,167,232 A | | 12/2000 | Jimenez et al. | |
| 6,204,494 B1 | | 3/2001 | Chavez | |
| 6,208,436 B1 | | 3/2001 | Cunningham | |
| 6,289,371 B1 | | 9/2001 | Kumpf et al. | |
| 6,320,745 B1 | | 11/2001 | Chen | |
| 6,320,870 B1 | | 11/2001 | Thaler | |
| 6,417,937 B1 | | 7/2002 | Batten et al. | |
| 6,421,135 B1 | | 7/2002 | Fresk et al. | |
| 6,426,498 B1 | | 7/2002 | Bohn et al. | |

FOREIGN PATENT DOCUMENTS

| | | |
|---|---|---|
| EP | 0642005 | 10/1997 |
| EP | 1381222 A2 | 1/2004 |

OTHER PUBLICATIONS

Foreign Search Report, Apr. 8, 2004, 1 page.

* cited by examiner

*Primary Examiner*—Thanh X. Luu

(57) ABSTRACT

Disclosed are image scanning systems and methods including an imaging apparatus having a first image capture area with an image scannable area that is smaller than the image to be scanned, a second platen on which the image to be scanned is disposed, and an optical element to focus the image to be scanned within the image scannable area of the first image capture area.

27 Claims, 2 Drawing Sheets

APPARATUS AND METHOD FOR CAPTURING OVERSIZE IMAGES FOR IMAGING DEVICES

FIELD OF THE INVENTION

The present invention generally relates to capturing images and, more particularly, to capturing oversized images.

DESCRIPTION OF RELATED ART

Devices that scan images from paper sheets, or other media, may include an image scanning surface, e.g., a glass plate or platen, against which sheets may be automatically or manually positioned for image scanning or capturing. Such devices, sometimes referred to as "flatbed" devices, include copiers, scanners, facsimile machines and other document imaging apparatuses. These devices may include Automatic Document Feeder (ADF) systems to move and position single or multiple sheets against and away from platens and hold the sheets in position for image scanning.

Imaging apparatuses limit image sizes that may be scanned to be within some finite image scannable area, but in no case are flatbed device image scannable areas larger than the maximum size of platens. The imaging apparatuses may accomplish image scanning using either contact optics image sensors or translated linear sensor arrays such as a charge-coupled devices (CCD) in combination with reduction optics. Contact optics image sensor systems scan images without optical or electronic reduction of original image sizes. Reduction optics, in the case of translated linear sensors, often are positioned between platens and sensors to decrease one of the dimensions of scanned images to be comparable to a lengthwise dimension of a linear sensor array that is translated to scan the other image dimension. As an example, if an image on an 8.5 by 11 inch sheet of paper is being scanned, the 8.5 inch dimension may be optically reduced to 1 inch for an identically-dimensioned linear sensor array that is 1 inch in length. The linear sensor array then is translated to scan the 11 inch length of the paper sheet. Generated signals—which often are digitized—are processed and when desired are scaled back to the original size of the paper sheet for printing or other utilization.

All imaging apparatuses, whether contact image or translated linear sensors, have established maximum paper sizes that may be scanned. These maximum sizes often are dimensioned to accommodate essentially standard paper sizes, such as 8.5×11 inches, 8.5×14 inches, A4 (21.0×29.7 centimeters), etc. Even though image-scannable areas or platens are dimensioned for standard paper sizes and may readily accommodate smaller sizes, it sometimes becomes necessary to image scan paper sheets that are larger than standard sizes. In such cases, it has been necessary to image scan multiple portions of an oversized paper sheet and then stitch or reconstruct scanned images.

BRIEF SUMMARY OF THE INVENTION

An embodiment of the present invention provides an image scanning system including an imaging apparatus having a first image capture area with an image scannable area that is smaller than the image to be scanned. The system comprising a second platen against which the image to be scanned is disposed, and an optical element to focus the image to be scanned within the image scannable area of the first image capture area.

Another embodiment of the present invention provides a method for image scanning using an imaging apparatus having a first platen with an image scannable area that is smaller than an object having an image to be scanned. The method comprising disposing the object against a second platen and reducing an image of the object using an optical element to focus the image to be scanned onto the image scannable area of the first platen.

DETAILED DESCRIPTION

Figure 1:
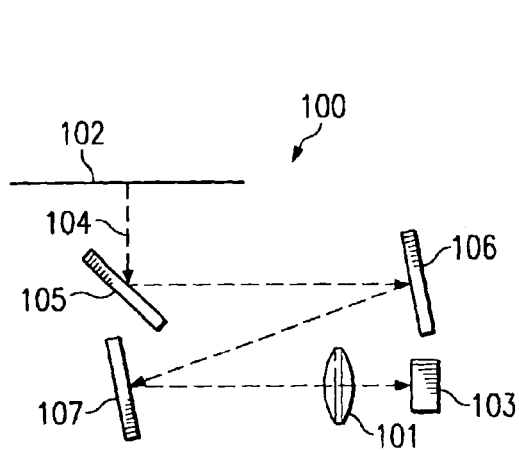
FIG. 1 is a view of an optical system in a prior art image scanner.

Referring to FIG. 1, a prior art optical path 100 for an optical image scanner is shown. The illustrated prior art arrangement is for a folded optical path. Lens 101 focuses an image from an object against platen 102, or other image capture area, onto sensor 103. Objects from which images may be captured include sheets of paper and other media, photographs, photographic negatives and positives, documents, three-dimensional articles, and other objects one may desire scanned. Light ray 104 from platen 102 is reflected from first mirror 105, second mirror 106 and then third mirror 107 before entering lens 101. Lens 101, mirrors 105, 106, and 107 are mounted for movement so that a complete image from the object supported against platen 102 can be scanned and received at sensor 103 as a focused image. Lens 101 is a refractive element and mirrors 105, 106, and 107 fold the optical path from platen 102 through lens 101 to sensor 103, and thereby reduce linear lengths from platen 102 to sensor 103.

Figure 2:
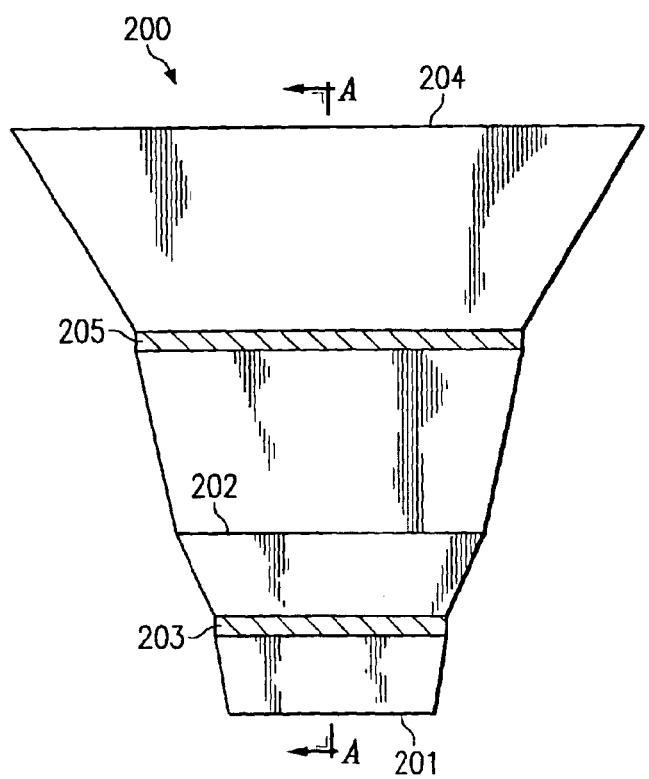
FIG. 2 is a schematic for an optical train according to an embodiment of the invention.

Referring to FIG. 2, a schematic for optical train 200 according to an embodiment of the invention is shown. The schematic for optical train 200 is shown in plan view and is simplified for ease of illustration. As such, FIG. 2 may represent either a single axis optical arrangement or a cylindrically-symmetric optical arrangement. In the case of a cylindrically-symmetric arrangement, the patterns for optical rays on all planes intersecting axis A—A, including those in FIG. 2, are the same. Alternatively, in the case of a single-axis optical arrangement, the patterns for optical rays on planes outside that of the paper for FIG. 2 and intersecting axis A—A could be different. For the embodiment discussed below a single-axis arrangement is shown in FIG. 2. The optical path shown in FIG. 1 also is a single-axis arrangement.

Figure 3:
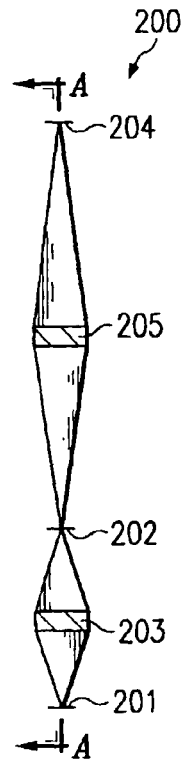
FIG. 3 is a schematic for the optical train of FIG. 2 on a plane intersecting axis A—A and perpendicular to the plane of the paper for FIG. 2.

FIG. 3 shows a schematic for optical train 200 on a plane intersecting axis A—A and perpendicular to the plane of the paper for FIG. 2.

Sensor 201 is shown in FIGS. 2 and 3 at the bottom, and for the embodiment of the invention discussed below will be identified as a CCD sensor. Above sensor 201 is platen 202 against which an object may be placed for image scanning. This shown arrangement has optical element 203 contracting images from platen 202 onto sensor 201 which is shorter than platen 202 as shown in FIG. 2, and focusing images from platen 202 onto sensor 201 as shown in FIG. 3. Optical element 203 may be a reflection system, a refractive system or a combination of reflective and refractive elements.

The combination of sensor 201, platen 202 and optical element 203 schematically shown in FIGS. 2 and 3 is used for many imaging apparatuses including flatbed scanners. Imaging apparatuses often use CCD arrays for sensor 201; the latter of which is moved, i.e., translated, out of the plane of the paper for FIG. 2, to image scan lengths of documents against platen 202, with optical element 203 contracting the widths of the documents to the length of sensor 201.

An embodiment consistent with the teachings of the invention provides another platen 204 spaced from platen 202. Platen 204 is larger than platen 202 and accordingly may support larger objects for image scanning than platen 202. Referring to FIG. 2, optical element 205 is interposed between platen 202 and platen 204. Optical element 205, contracts images from platen 204 to the size of platen 202 image scannable areas and in doing so focuses images onto platen 202. Thus, oversized images for platen 202 are captured from platen 204 for image scanning using sensor 201.

Figure 5:
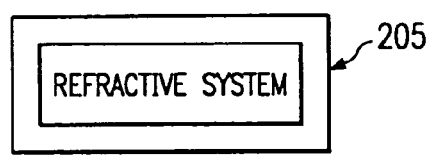
FIG. 5 shown an optical element comprising a refractive system.
Figure 6:
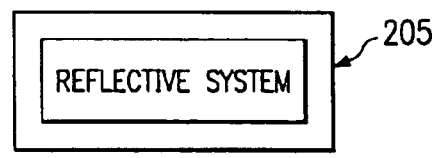
FIG. 6 shown an optical element comprising a reflective system.

Optical element 205 may be a reflective system (FIG. 6), a refractive system (FIG. 5) or a combination of reflective and refractive elements. Furthermore, optical element 203 and optical element 205, despite possible differences in focusing power, do not have to be constructed of identical reflective, refractive, or combination type systems. Optical element 203 and optical element 205, according to embodiments of the invention, may also comprise providing a single-axis optical arrangement and/or a cylindrically symmetric arrangement.

Referring to FIGS. 2 and 3, the illustrated embodiment utilizes single-axis optical arrangements for both optical element 203 and optical element 205. Such an arrangement may efficiently be provided for a flatbed scanner having sensor 201, optical element 203 and platen 202, and an Automatic Document Feeder (ADF) having platen 204. Referring to FIGS. 2 and 3 the shown embodiment adds optical element 205 to the ADF such that the combination of optical element 203 and optical element 205 contract images to the width of sensor 201. Optical elements 203 and 205 translate in unison to accomplish image scanning with sensor 201 of a page having a length that would fit against platen 202.

Alternatively, optical element 203 may be a single-axis optical arrangement and optical element 205 may have a cylindrically-symmetric arrangement. In such cases, the combination of optical element 203 and optical element 205 contract images to the width of sensor 201 and optical element 205 further contracts the length of images to be scanned so they are focused at a plane corresponding to platen 202. It should be appreciated that platen 202 is not necessary for capturing of the image by sensor 201 and, therefore, may be omitted and/or replaced by optical elements, or an image capture area otherwise defined, as desired. Again, such an arrangement may be incorporated in a combined flatbed scanner with an ADF.

Use of reduction optics causes decreased scanning resolutions. Imaging apparatuses that use reduction optics, such as those having linear array sensors, provide reduced resolutions over what could be provided by contact image sensors without reduction optics. These resolution reductions typically are not an operational-limiting factor because, for example, in the case of CCD linear array sensors, sufficiently high resolutions are available. Specifically, 200–300 dots per inch (dpi) or pixels per inch (ppi) resolutions are adequate for useful image scanning. These requirements are balanced against available image scanning apparatus system resolutions of 1200–2400 ppi. Referring to FIG. 2, optical train 200 with optical element 205 for the shown embodiment reduces resolution of the combination of platen 202, optical element 203 and sensor 201 by the ratio of the dimension of the image scannable area of platen 202 to the dimension captured from platen 204. For example, if the combination of platen 202, optical element 203 and sensor 201 has a resolution of 1200 ppi and optical element 205 captures a dimension of 11 inches down to a dimension of 8.5 inches for platen 202, then the reduced resolution is:

$$\left(\frac{1200 \text{ ppi} \times 8.5 \text{ inches}}{11 \text{ inches}}\right) = 927.3 \text{ ppi}$$

This reduced resolution still is 3.1 times higher than that required for useful image scanning.

Figure 4:
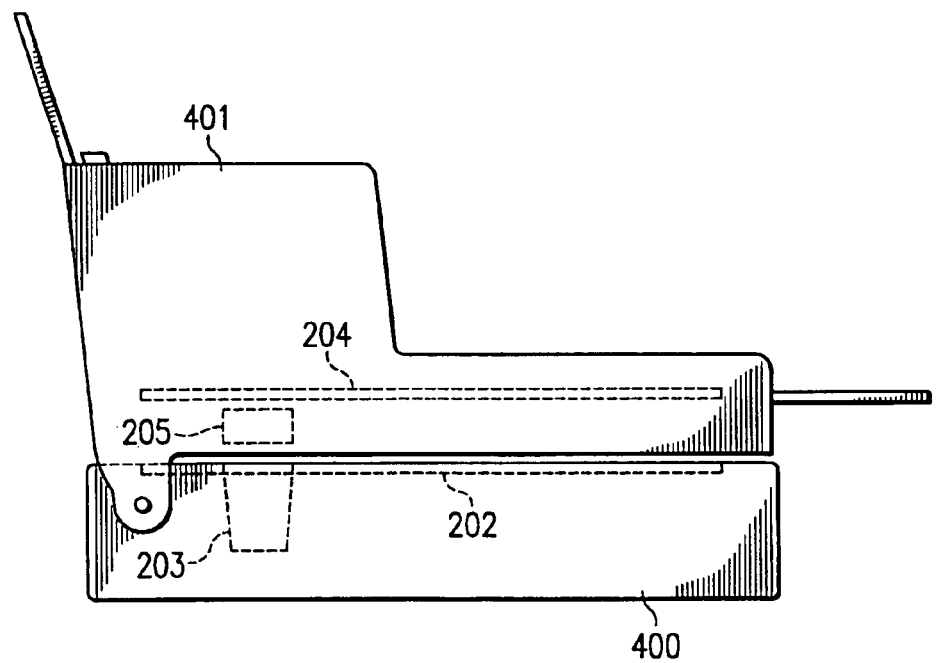
FIG. 4 is a simplified side view of a flatbed scanner combined, according to an embodiment of the invention, with an automatic document feeder.

FIG. 4 shows a perspective view of a combined flatbed scanner 400 and ADF 401 with optical element 205 diagrammatically shown in phantom for an embodiment of the invention. This embodiment provides a convenient arrangement for providing imaging apparatuses such as flatbed scanner 400 with a capability to capture oversized images.

What is claimed is:

1. An image scanning system including an imaging apparatus having a first image capture area with an image scannable area that is smaller than the image to be scanned, the system comprising:
    a first platen;
    a second platen against which the image to be scanned is disposed; and
    an optical element disposed to focus the image to be scanned within the image scannable area of the first image capture area.

2. The system of claim 1 further comprising an automatic document feeder that includes the second platen.

3. The system of claim 1 wherein the imaging apparatus is a flatbed scanner.

4. The system of claim 1 wherein the optical element comprises a refractive system.

5. The system of claim 1 wherein the optical element comprises a reflective system.

6. An image scanning system including an imaging apparatus having a first platen with an image scannable area that is smaller than an object having an image to be scanned, the system comprising:
    a second platen to support the object; and
    an optical element disposed to focus the object within the image scannable area of the first platen.

7. The system of claim 6 further comprising an automatic document feeder that comprises the second platen.

8. The system of claim 6 wherein the imaging apparatus is a flatbed scanner.

9. The system of claim 6 wherein the optical element comprises a refractive system.

10. The system of claim 6 wherein the optical element comprises a reflective system.

11. A method for scanning an image using an imaging apparatus having a first platen with an image scannable area that is smaller than the image to be scanned, the method comprising:

disposing the image to be scanned against a second platen; and reducing the image to be scanned using an optical element to focus the image to be scanned onto the image scannable area of the first platen.

12. The method of claim 11 further comprising:

disposing the image to be scanned against the second platen using an automatic document feeder.

13. The method of claim 11 further comprising:

reducing the image focused onto the image scannable area of the first platen using an optical element to focus the image focused onto the image scannable area of the first platen onto a sensor.

14. A method for image scanning using an imaging apparatus having a first platen with an image scannable area that is smaller than an object having an image to be scanned, the method comprising:

disposing the object against a second platen; and reducing said image to be scanned using an optical element to focus the image to be scanned onto the image scannable area of the first platen.

15. The method of claim 14 further comprising:

disposing the object onto the second platen using an automatic document feeder.

16. The method of claim 14 further comprising:

reducing the image focused onto the image scannable area of the first platen using an optical element to focus the image focused onto the image scannable area of the first platen onto a sensor.

17. An image scanning system including a first platen having a first image capture area with an image scannable area that is smaller than the image to be scanned, the system comprising:

a second platen against which the image to be scanned is disposed; and an optical element disposed to focus the image to be scanned within the image scannable area of the first image capture area.

18. The system of claim 17 further comprising:

another optical element disposed to focus the image within the image scannable area of the first image capture area onto a sensor.

19. The system of claim 18 further comprising an automatic document feeder that includes the second platen.

20. The system of claim 18 wherein the imaging apparatus is a flatbed scanner.

21. An image scanning system including an imaging apparatus having a first image capture area with an image scannable area that is smaller than the image to be scanned, said first image capture area being an area of said image scanning system in which an image to be scanned is placed for scanning when said image is not larger than said image scannable area of said first image capture area, the system comprising:

a platen against which the image to be scanned is disposed; and an optical element disposed to focus the image to be scanned within the image scannable area of the first image capture area.

22. The system of claim 21 further comprising:

another optical element disposed to focus the image within the image scannable area of the first image capture area onto a sensor.

23. An image scanning system including an imaging apparatus having a first image capture area with an image scannable area that is smaller than the image to be scanned, said first image capture area being an area of said image scanning system against which an image to be scanned is placed for scanning when said image is not larger than said image scannable area of said first image capture area, the system comprising:

a second image capture area against which the image to be scanned is disposed; and an optical element disposed to focus the image that is against the second image capture area within the smaller image scannable area of the first image capture area.

24. The system of claim 23 further comprising:

another optical element disposed to focus the image within the image scannable area of the first image capture area onto a sensor.

25. An image scanning system including an imaging apparatus having a first image capture area with an image scannable area that is smaller than the image to be scanned, said first image capture area being an area of said image scanning system in which an image to be scanned is placed for scanning when said image is not larger than said image scannable area of said first image capture area, the system comprising:

a second image capture area against which the image to be scanned is disposed, the second image capture area spaced from the first image capture area; and an optical element disposed to focus the image to be scanned within the image scannable area of the first image capture area.

26. The system of claim 25 wherein said first image capture area is spaced from a sensor, and wherein an optical train associated with said sensor comprises said second image capture area and said first image capture area.

27. The system of claim 25 further comprising:

another optical element disposed to focus the image within the image scannable area of the first image capture area onto a sensor.

* * * * *